US012664760B2

(12) United States Patent
Spitzer et al.

(10) Patent No.: US 12,664,760 B2
(45) Date of Patent: Jun. 23, 2026

(54) METHOD OF ANALYZING A COMPONENT, METHOD OF TRAINING A SYSTEM, APPARATUS, COMPUTER PROGRAM, AND COMPUTER-READABLE STORAGE MEDIUM

(71) Applicant: Fujitsu Technology Solutions GmbH, Munich (DE)

(72) Inventors: Philipp Spitzer, Munich (DE); Dimitrij Shulkin, Munich (DE); Marcel Naujeck, Munich (DE); Stefan Schiffer, Munich (DE)

(73) Assignee: Fujitsu Germany GmbH, Munich (DE)

( * ) Notice: Subject to any disclaimer, the term of this patent is extended or adjusted under 35 U.S.C. 154(b) by 476 days.

(21) Appl. No.: 17/924,706

(22) PCT Filed: Sep. 29, 2021

(86) PCT No.: PCT/EP2021/076841
§ 371 (c)(1),
(2) Date: Nov. 11, 2022

(87) PCT Pub. No.: WO2022/073827
PCT Pub. Date: Apr. 14, 2022

(65) Prior Publication Data
US 2024/0296661 A1 Sep. 5, 2024

(30) Foreign Application Priority Data
Oct. 7, 2020 (DE) .......................... 102020126291.4

(51) Int. Cl.
*G06V 10/77* (2022.01)
*G06V 10/82* (2022.01)

(52) U.S. Cl.
CPC .......... *G06V 10/7715* (2022.01); *G06V 10/82* (2022.01)

(58) Field of Classification Search
CPC .. G06V 10/7715; G06V 10/82; G06V 10/774; G06V 2201/06; G06V 10/454
See application file for complete search history.

(56) References Cited

U.S. PATENT DOCUMENTS 8,345,962 B2* 1/2013 Yu ............................ G06N 3/08
382/156
2016/0140436 A1* 5/2016 Yin ...................... G06V 40/172
706/20
(Continued)

FOREIGN PATENT DOCUMENTS

CN 110766660 A 2/2020
EP 3537348 A1 * 9/2019 ............. G06V 10/87
(Continued)

OTHER PUBLICATIONS

Communication under Article 94(3) EPC dated Dec. 14, 2023, of counterpart European Patent Application No. 21786815.7., along with an English machine translation.
(Continued)

*Primary Examiner* — Solomon G Bezuayehu
(74) *Attorney, Agent, or Firm* — DLA Piper LLP (US)

(57) ABSTRACT

A method of analyzing a component includes receiving an image of the component; performing feature recognition on the received image using a plurality of neural networks, wherein at least one first neural network of the plurality of neural networks is trained based on a first set of training images, at least one second neural network of the plurality of neural networks is trained based on at least one second set of training images, and the at least one first neural network and the at least one second neural network each include a (Continued)

global pooling layer; and displaying a result of the feature recognition with reference to a depiction of the component.

13 Claims, 2 Drawing Sheets

(56) References Cited

U.S. PATENT DOCUMENTS

| | | | |
|---|---|---|---|
| 2017/0039456 A1 | 2/2017 | Saberian et al. | |
| 2017/0286809 A1* | 10/2017 | Pankanti | G06V 10/82 |
| 2017/0357879 A1* | 12/2017 | Odaibo | G06N 20/20 |
| 2018/0089497 A1* | 3/2018 | Romanenko | G06V 10/255 |
| 2018/0157938 A1* | 6/2018 | Wang | G06V 10/82 |
| 2018/0268257 A1* | 9/2018 | Ren | G06T 7/0004 |
| 2018/0373963 A1* | 12/2018 | Lo | G06N 3/084 |
| 2019/0005386 A1* | 1/2019 | Chen | G06N 3/094 |
| 2019/0138888 A1* | 5/2019 | Sekiyama | G06N 3/045 |
| 2019/0156157 A1* | 5/2019 | Saito | G06F 18/217 |
| 2019/0191988 A1* | 6/2019 | Gargeya | A61B 3/1241 |
| 2020/0005084 A1* | 1/2020 | Ambikapathi | G06V 10/82 |
| 2020/0027207 A1* | 1/2020 | Zhang | G06F 18/2135 |
| 2020/0057919 A1* | 2/2020 | Lovin | G06N 3/045 |
| 2020/0085382 A1* | 3/2020 | Taerum | A61B 5/055 |
| 2020/0089969 A1* | 3/2020 | Lakshmi Narayanan | |
| | | | G06V 20/49 |
| 2022/0083795 A1* | 3/2022 | Zhang | G06V 20/64 |
| 2022/0343632 A1* | 10/2022 | Hattori | G06V 10/764 |
| 2023/0022631 A1* | 1/2023 | Rothmund | G06T 7/0004 |

FOREIGN PATENT DOCUMENTS

| | | |
|---|---|---|
| JP | 2012-26982 | 9/2012 |
| WO | 2017/176384 A2 | 10/2017 |

OTHER PUBLICATIONS

Boguslaw Cyganek, "Object Detection and Recognition in Digital Images Theory and Practice," John Wiley & Sons, Ltd, 2013 (Summary).

Everlandio Fernandes et al., "An Ensemble of Convolutional Neural Networks for Unbalanced Datasets: a case Study with Wagon Component Inspection," International Joint Conference on Neural Networks, Jul. 8, 2018, pp. 1-6.

Hui Lin et al., "Automated defect inspection of LED chip using deep convolutional neural network," Journal of Intelligent Manufacturing, Mar. 29, 2018, pp. 2525-2534.

Liang Xu et al., "A Weakly Supervised Surface Defect Detection Based on Convolutional Neural Network," IEEE Access, vol. 8, 2020, pp. 42285-42296.

Xiaoming Lv et al., "Deep Metallic Surface Defect Detection: the New Benchmark and Detection Network," Sensors, 2020, 1-15.

International Search Report dated Jan. 31, 2022 in counterpart International Application No. PCT/EP2021/076841.

Written Opinion dated Jan. 31, 2022 in counterpart International Application No. PCT/EP2021/076841.

Notice of Reasons for Rejection dated Mar. 5, 2024, from counterpart Japanese Patent Application No. JP 2023-521376 with a Summary in English.

Sun, Kyung Ho et al. "Vison-Based Fault Diagnostics Using Explainable Deep Learning with Class Activation Maps," IEEE Access, vol. 8, pp. 129169-129179, 2020, printout: https://ieeexplore.ieee.org/docuent/9142228.

* cited by examiner

METHOD OF ANALYZING A COMPONENT, METHOD OF TRAINING A SYSTEM, APPARATUS, COMPUTER PROGRAM, AND COMPUTER-READABLE STORAGE MEDIUM

TECHNICAL FIELD

This disclosure relates to a method of analyzing a component, a method of training a system to analyze a component, an apparatus that analyzes a component and an apparatus that trains a system to analyze a component, a computer program, and a computer readable storage medium.

BACKGROUND

Components manufactured by machines, for example, may have features on their surfaces or inside. These features may be intended structures such as an engraving or similar, or may be a defect in the component. A defect on a surface of or inside such a component can significantly reduce the value of the component or even render it unusable. If such defects are not detected, they can also pose a significant safety risk. For this reason, it is necessary to reliably detect such features on the surfaces or inside of such components and, if necessary, to distinguish between different types of features.

Such feature recognition is performed by an expert, for example. However, this is very time-consuming and can deliver considerably fluctuating results due to human errors. With machine recognition of such features, it is problematic today that there is no sufficiently high reliability in the feature recognition. As a result, numerous components are rejected as having a feature if systems that detect these features are set so sensitively that as few defective components as possible remain undetected. This leads to a high reject rate of such components, which causes high costs and material wastage.

SUMMARY

We provide a method of analyzing a component including receiving an image of the component; performing feature recognition on the received image using a plurality of neural networks, wherein at least one first neural network of the plurality of neural networks is trained based on a first set of training images, at least one second neural network of the plurality of neural networks is trained based on at least one second set of training images, and the at least one first neural network and the at least one second neural network each include a global pooling layer; and displaying a result of the feature recognition with reference to a depiction of the component.

We also provide a method of training a system to analyze a component including creating a first set of training images, wherein the first set of training images includes training images showing at least a portion of at least one component and recognizable features on the at least one component are marked in the training images of the first set; training at least one first neural network based on the first set of training images, wherein the at least one first neural network includes a global pooling layer; creating at least one second set of training images, the at least one second set of training images including training images in which features on at least one component have not been correctly detected by the at least one first neural network; training at least one second neural network based on the at least one second set of training images, wherein the at least one second neural network includes a global pooling layer and recognizable features on the training images of the second set of training images are marked or image sections of the training images including a recognizable feature are assigned to corresponding feature classes; and aggregating the at least one first neural network and the at least one second neural network into a plurality of neural networks.

We further provide a device that analyzes a surface of a component is configured to perform the method of analyzing a component including receiving an image of the component; performing feature recognition on the received image using a plurality of neural networks, wherein at least one first neural network of the plurality of neural networks is trained based on a first set of training images, at least one second neural network of the plurality of neural networks is trained based on at least one second set of training images, and the at least one first neural network and the at least one second neural network each include a global pooling layer; and displaying a result of the feature recognition with reference to a depiction of the component.

LIST OF REFERENCE SIGNS

Figure 1:
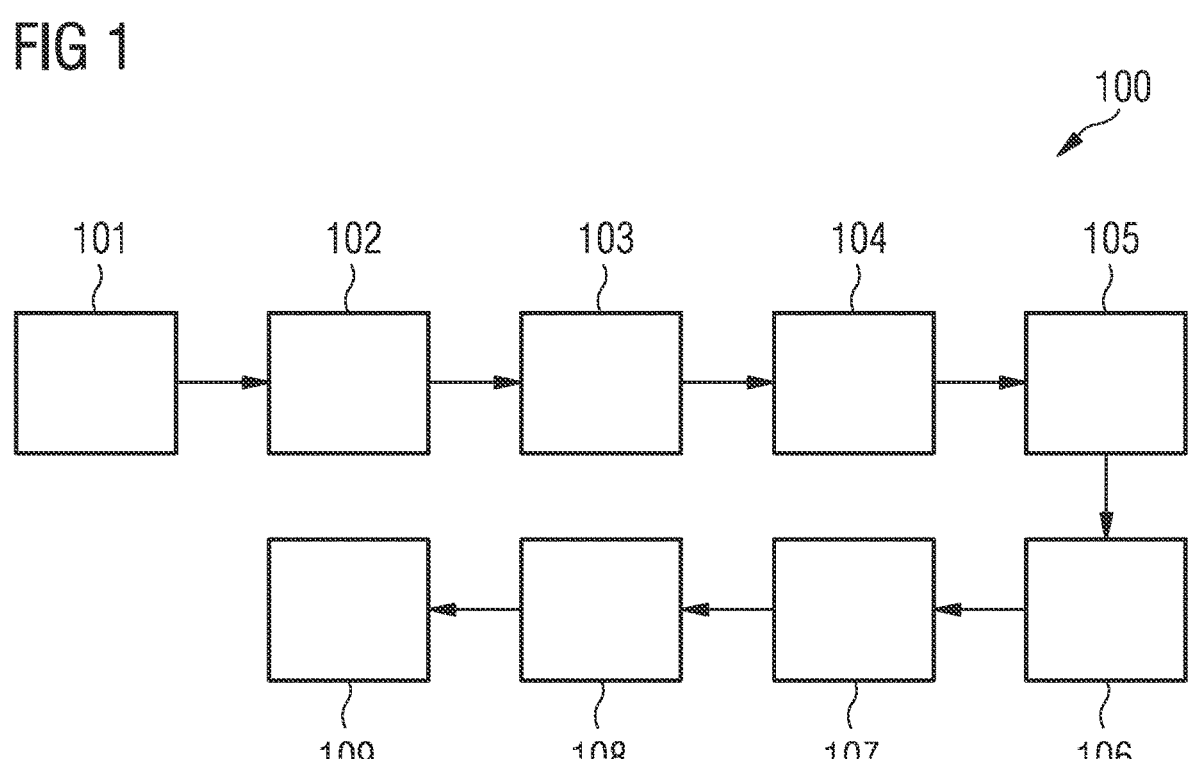
FIG. 1 shows a flowchart of a method of training a system to analyze a component.

1 Device
2 Component
3 Computer system
4 first neural network
5 second neural network
6 Training image
7 Image section
8 Ensemble
9 Recording and display device
10 Display
100 Method
200 Method
101-109 Steps
201-206 Steps

DETAILED DESCRIPTION

We provide a method of analyzing a component comprising:
  receiving an image of the component;
  performing feature recognition on the received image using a plurality of neural networks, wherein at least one first neural network of the plurality of neural networks is trained based on a first set of training images, at least one second neural network of the plurality of neural networks is trained based on at least one second set of training images, and the at least one first neural network and the at least one second neural network each comprise a global pooling layer; and
  displaying a result of the feature recognition with reference to a depiction of the component.
  It is thus possible to detect features on a surface of or inside the component with a very high degree of reliability on the basis of a captured image and to visualize these features. The features are, for example, defects on the surface or inside the component. Alternatively or additionally, the features can also be intentional surface structures such as engravings or other.

A global average pooling layer, for example, is suitable as the global pooling layer. Alternatively, a global maximum pooling layer or a global minimum pooling layer can be used.

The at least one first neural network and/or the at least one second neural network are, for example, convolutional neural networks (CNNs). The global pooling layer is advantageously a first layer following the last convolutional layer.

Advantageously, machine recognition of these features is provided with a high recognition rate. Performing the feature recognition with at least two trained neural networks provides this high reliability in recognizing the features. Thus, the method described above can be used in particular for components for which the detection of defects or other features is complicated. For example, this concerns components manufactured by a die casting process. Components manufactured by die casting sometimes have defects or other features that are difficult to detect. However, the same also applies to components manufactured by other means. The components examined herewith can, for example, be made of plastic, metal, ceramic, glass or other materials. Such features are, for example, features that can be detected on a surface of the component, by a photograph or other image of the surface of the component, or on the inside, by corresponding imaging methods such as X-ray images or ultrasound images. With our method, even such defects that are difficult to detect can be found with a high degree of reliability.

A further advantage of the method is that not only features are detected, but also a result of the detection of features is displayed with respect to the surface or a corresponding image of the inside of the component. In other words, the features detected on the surface or inside of the component are localized with respect to the surface or the image of the inside of the component and are displayed accordingly. In this way, a user of the method shown above can immediately recognize at which location of the component a feature is located. This enables a fast, time-saving examination of components and a corresponding reliable, rapid quality assurance.

The method may be a computer-implemented method.

In at least one example, a method of displaying probabilities calculated using neural networks is used to display the result of the feature recognition. In particular, a class activation mapping method is used.

The calculated probabilities in this example indicate the likelihood that a feature is or is not present at a corresponding location for which the probability is indicated. In other words, the representation of the probabilities indicates which areas of the examined image attract an attention of the at least one first or at least one second neural network. Although the neural networks only perform a classification of an imaged part of the component, i.e., detect whether structures on the surface or inside are detected as features or not, it is also possible to represent in this way where the areas with features are located.

An advantage here is that even with neural networks trained only for classification, a graphical representation of the local arrangements of features is possible.

At least a portion of the received image may be augmented before or during the step of performing feature detection.

Augmenting in this context refers to presenting the at least a portion of the received image in a different form and includes, for example, rotating, flipping, or applying a filter to the at least a portion of the received image.

An advantage here is that more reliable results can be achieved in this way during feature recognition. For example, shading and reflections on the surface or other impairments of images, including those of the inside of the component, can this way be better distinguished from features.

The received image of the component may further be used to further train at least one of the plurality of neural networks.

The received image can be used both for training the at least one first neural network and/or for training the at least one second neural network. An advantage here is that in this way the neural networks can be trained further to achieve improved feature recognition results. This enables the neural networks to be extended independently without the need for experts. For this purpose, for example, a so-called "semi-supervised-learning" is used.

The received image may be divided into a plurality of image sections prior to the step of performing feature recognition.

These individual image sections can then be processed individually with feature recognition. The advantage here is that a computing power for processing the image sections can be reduced compared to the entire captured image. In this way, computing power is saved. Furthermore, processing time is saved in this way. Furthermore, this allows a more accurate detection and especially a more accurate localization of the features in the received image.

We also provide a method of training a system to analyze a component comprising:

creating a first set of training images, the first set comprising training images showing at least a portion of at least one component and recognizable features on the at least one component being marked in the training images of the first set;

training at least one first neural network based on the first set of training images, wherein the at least one first neural network comprises a global pooling layer;

creating at least one second set of training images, the at least one second set comprising training images in which features on at least one component were not correctly detected by the at least one first neural network;

training at least one second neural network based on the at least one second set of training images, wherein the at least one second neural network comprises a global pooling layer and detectable features on the training images of the second set of training images are marked or image sections of the training images comprising a detectable feature are assigned to corresponding feature classes; and aggregating the at least one first neural network and the at least one second neural network to a plurality of neural networks.

A global average pooling layer, for example, is suitable as a global pooling layer. Alternatively, a global maximum pooling layer or a global minimum pooling layer can be used.

The at least one first neural network and/or the at least one second neural network are, for example, convolutional neural networks (CNNs). The global pooling layer is advantageously a first layer following the last convolutional layer.

Advantageously, in the method, a system that analyzes components is trained that achieves a particularly high recognition rate when analyzing such components. In the training images of the first set of training images, features on the at least one component shown in the training images are marked. In other words, together with corresponding image files, it is stored where features are located in these images. This is also referred to as "labeled" images. By training the at least one first neural network with these training images, at least one first neural network is generated which detects features with a relatively high probability.

The at least one second set of training images used to train the at least one second neural network comprises training images in which depicted features of the components have not been correctly detected by the at least one first neural network. For example, the at least one second set of training images comprises training images that were used to test the at least one first neural network and were not properly analyzed by the at least one first neural network. The at least one second set of training images may also comprise only portions of such test images to which the incorrect analyzing applies.

Training the at least one second neural network with the at least one second set of training images produces a second neural network that is trained, in particular, to recognize features not detected by the at least one first neural network. In other words, the at least one second neural network is included with the at least one first neural network in an ensemble for producing improved results improved results. Creating the at least one second set of training images and training the at least one second neural network based thereon is also referred to as a "hard negative mining" method. Alternatively, a so-called "hard-positive mining" method may be used.

Training the at least one second network based on at least one second set of training images may be performed once such that at least one second neural network is trained based on a second set of training images. However, the process may also be performed multiple times such that further second neural networks are trained based on further second sets of training images. These can be created with so-called "hard-negative" training images as described above, or with so-called "hard-positive" training images. The further second sets of training images can then, for example, in turn contain training images that were not correctly analyzed by previously trained second neural networks (hard-negative/hard-positive).

Both the at least one first neural network and the at least one second neural network each have a global pooling layer. This first layer following the last convolutional layer is in both instances the global-pooling layer, and converts a last two-dimensional layer of the respective neural network and stores the determined results in a vector. This global-pooling layer replaces, for example, a final fully-connected layer. An advantage here is that the global-pooling layers as the first layers following the last convolutional layers are particularly suitable for displaying the results of an analysis of a component in a so-called "heat map."

Combining the at least one first neural network and the at least one second neural network into a plurality of neural networks means that an ensemble of the first and second neural networks is created that can analyze a component in a subsequent analysis.

The method may be a computer-implemented method.

Training the at least one first neural network and/or training the at least one second neural network may be performed using supervised learning.

An advantage herein is that in this way errors in a recognition process of features by the neural networks are reduced. For this purpose, predicted results of the respective neural networks with respect to recognized features are verified using the respective labeled training images and are corrected if necessary.

The features not correctly detected by the at least one first neural network may comprise features that have not been detected by the at least one first neural network, although they are present and marked, or features that have been detected although a corresponding location of an associated training image is not marked and a component displayed in the associated training image has no feature at this location. Alternatively or additionally, the features not correctly detected by the at least one first neural network comprise features that were detected by the at least one first neural network although a corresponding location of an associated training image is not marked, but a component displayed in the associated training image has a feature at this location. In particular, only sections of larger images to which the aforementioned examples apply can also be used as training images for the at least one second neural network. For further second sets of training images, the above-mentioned examples can be applied analogously to features that were not correctly detected by previously trained second neural networks.

Using such training images for the at least one second set of training images has the advantage that at least one second neural network can be trained with these training images, which can compensate with high reliability for errors in a result of an analysis by the at least one first neural network or previously trained second neural networks. In addition, training images or image sections can also be used for the at least one second set of training images comprising features correctly detected by the at least one first neural network or by at least one previously trained second neural network.

Combining the at least one first neural network and the at least one second neural network into a plurality of neural networks may further comprise:

assigning a first weighting with which a result of an analysis of the at least one first neural network is evaluated, and assigning at least one second weighting with which a result of an analysis of the at least one second neural network is evaluated.

It is advantageous that by a suitable selection of the weightings, with which the results of the analyses of the respective neural networks are weighted, a best possible total result can be obtained with an analysis of components. Best possible here means a result with the highest possible reliability. For example, best possible weightings can be tested by test analyses. For example, the at least one first neural network can be assigned a higher weighting than the at least one second neural network. In this example, a result of an analysis with the at least one second neural network overrules a result of an analysis with the at least one first neural network, if the first neural network provides an uncertain result only, but the at least one second neural network determines with high probability that there is an error in the analysis of the first neural network.

We further provide an apparatus that analyzes a component configured to perform the method first described above.

We still further provide an apparatus that trains a system to analyze a component configured to perform the second method described above.

We yet further provide a computer program comprising instructions that, when the computer program is executed by a computer, cause the computer program to execute the method according to the first and second methods described above.

We still yet further provide a computer readable storage medium comprises the computer program described above.

Examples of our methods, systems, apparatus, programs and storage are explained in more detail below with reference to the schematic drawings.

FIG. 1 shows a flowchart of a method 100 of training a system to analyze a component. The method 100 according to FIG. 1 is explained by an example in which a system that analyzes a surface of a component is trained. However, this is only to be understood as an example. Analogously, the method can also be used to train a system to analyze another part of a component. For example, cutting surfaces, fracture areas, X-ray images, ultrasound images or the like can be used to analyze an internal area of the component.

In a first step 101 of the method 100, a first set of training images is created. The first set of training images is a plurality of 2D RGB images showing surfaces of components. The images show surfaces of components that are similar to components that are ultimately to be analyzed by the system to analyze a surface of a component. For example, if the system is to be used to analyze die cast components, the images of the first set of training images show surfaces of such die cast components. Of course, any other type of component can be used. Alternatively, other images can be used instead of the 2D RGB images, for example, black and white images, gray scale images, other photo images, X-ray images, ultrasound images or the like. An image type of the training images matches for a best result of the later analysis with an image type of such images, which are later used for feature recognition.

In the images of the first set of training images, features that are visible on the surfaces of the components are labeled. These are also referred to as labeled images. The features are, for example, unwanted defects such as unintended holes, scratches, cracks, dents, dints, marks or the like, or other features such as engravings, folds or intended openings that are to be detected by the system. Marking of the features in the images of the first set of training images was done, for example, by an expert. The labels of the features are stored with XY coordinates related to the respective images. Labelling the features in the images can alternatively also be done at a later moment, which is described further below. In this example, the images of the first set of training images are initially not labeled.

In the first step 101, the images of the first set of training images are further divided into a plurality of image sections. These image sections are also referred to as "patches." For example, the images are subdivided into a plurality of image sections of the same size. In this example, the size of the image sections is adapted to an input size of neural networks, which are to be trained with this system. The image sections may be arranged to be contiguous. Alternatively, the image sections may overlap each other.

In a second step 102, the image sections of the images of the first set of training images are classified. For this purpose, each section of each image is assigned a predefined class. The predefined classes distinguish image sections that do not have features from image sections that do have a feature. This is done automatically, for example, by detecting whether the respective image section is at least partially located in an area marked with a feature.

For the example where features in the images were not initially labeled, the labeling of the features can be performed simultaneously with the classification in this step

102. In this example, the image sections of the unlabeled images created in step 101 are classified directly by an expert. Thus, for each image section it is decided whether it is an image section showing, at least partially, a feature or a part of a feature. At the same time, the image sections that at least partially show at least a part of a feature are assigned to the predetermined classes of features.

For classification, there is a class "normal" assigned to those image sections that do not have any features. There are also classes assigned to certain types of features. Thus, there are classes "feature 1" to "feature n" assigned to image sections with corresponding features. These different feature classes refer to different types of features to be recognized and distinguished according to the classes by the later trained neural networks. For example, if scratches on a surface as well as unwanted holes in the surface and, for example, engravings are to be distinguished from each other by the neural networks trained later, there is a class 1 assigned to image sections with a scratch, a class 2 assigned to image sections with an unwanted hole, and a class 3 assigned to an image section on which an engraving is recognizable.

Assignment of the classes to the respective image sections can be performed, for example, on the basis of a threshold value. In this example, a respective image section is only assigned to the corresponding class if a portion of the image section that has the corresponding feature exceeds the threshold value. For example, a threshold value of 10% to 25% can be selected for this purpose. This threshold value can depend in particular on a common size of the respective features.

In a third step 103, a graphical filter is applied to all image sections of the images of the first set of training images. For example, such as a black and white filter that converts the 2D RGB images into black and white images. In particular, a so-called Otsu filter is suitable for this purpose, which converts the RGB images into binary black and white images.

After applying the filter to the image sections of the images of the first set of training images, all image sections that do not show any part of a component can be sorted out in a simple automated way. For example, these are image sections that show a background in front of which the component was photographed. These sections are not relevant for training the neural networks. Sorting out such image sections enables faster and more accurate training of the neural networks. Also, a threshold value can be selected above which an image section is to be sorted out. For example, image sections can only be considered if at least 5% of the image section shows a part of the component.

In a fourth step 104, a set of first neural networks is prepared. The first neural networks may be pre-trained neural networks or neural networks that are newly trained. In particular, the first neural networks are convolutional neural networks (CNNs). For example, pre-trained open source networks can be used for this purpose. For example, the CNN "ResNet50" can be used for this purpose. Furthermore, it is possible to use different first neural networks whose results are averaged afterwards. In addition, requirements for analyzing the surfaces of components can be taken into account when selecting the networks. For example, certain neural networks can be selected depending on whether more precise results or a shorter analysis time is desired when analyzing the surfaces of the components.

In the fourth step 104, it is further ensured that the first neural networks each have a global-pooling layer, for example, a global-average-pooling layer, a global-maximum-pooling layer, or a global-minimum-pooling layer. In this example, the global-pooling layer is a first layer following the last convolutional layer. No matter what neural network is selected as first neural network, if the output layer is not a global-pooling layer, an existing layer of the network firstly following the last convolutional layer is removed and a global-pooling layer is inserted instead. The global pooling layer is selected here as the first layer following the last convolutional layer for the first neural networks since this is particularly suitable for a visualization of the analysis results.

In the fourth step 104, the global-pooling layer is also connected to sigmoid or softmax layers present in the first neural networks. Additional layers may be inserted between the global-pooling layer and the sigmoid or softmax layer to avoid or mitigate overfitting. The sigmoid layer is used in particular when there are at most two feature classes. The softmax layer is used in particular when more than two feature classes are present. The sigmoid or softmax layer is a final layer that determines, when a feature is detected, which class that feature belongs to.

In addition to using additional intermediate layers, augmenting the image sections and using multiple first neural networks can also serve to reduce or avoid overfitting. This has the advantage that even if only small amounts of data are available for training the neural networks, an accurate and reliable training of the neural networks is possible.

In a fifth step 105 the first neural networks are trained on the basis of the labelled first set of training images. For training the first neural networks a so-called "supervised-learning" is used. The predicted results of the first neural networks are checked during the training procedure using the labeled images of the first set of training images. In this way it is possible to correct errors in the predicted results and thus achieve a better training result of the first neural networks.

Alternatively, the training of the first neural networks can also be performed using semi-supervised learning. With first neural networks trained using semi-supervised learning, it is also possible to recognize features that are more different from the features in the training images.

During the training of the first neural networks, the image sections, based on which the first neural networks are trained, are augmented. Augmenting the image sections includes, for example, rotating, flipping, applying a noise filter, sharpening and the like of the image sections. Alternatively, it is also possible to complete the augmenting of the image sections before the training process and store the augmented image sections for the training process. In other words, augmenting can be performed online or offline.

In particular, it is possible to perform augmentation using random algorithms so that random changes are made to the image sections. In this way, more robust models can be trained. Another advantage of augmenting the sections is, for example, that influences of different exposures and/or reflections or other visual impairments of the images of the first set of training images can be reduced or even eliminated.

In a sixth step 106, all first neural networks are tested using a test data set. In the example shown here, the images of the test data set are also divided into image sections, classified, labeled, and irrelevant image sections are pre-sorted out using graphical filters, analogously to the training images. In other words, the images of the test data set are prepared analogously to steps 101 to 103.

Based on the results obtained from analyzing the images of the test data set, an ensemble of neural networks is selected from the first neural networks to be ultimately used for analyzing surfaces of components. The ensemble comprises at least one of the first neural networks. In particular, the at least one or more of the first neural networks that achieve the most reliable result when analyzing the test data are selected.

In a seventh step 107, a second set of training images is assembled. The second set of training images consists of image sections of the images of the test data set in which features were not correctly detected during testing in step 106. In the example shown here, this relates both to configurations in which putative features were detected by the first neural networks, which, however, do not exist, or in which labeled features were not detected by the first neural networks, and to configurations in which the first neural networks detected features during testing that actually exist in the image sections of the test images but which were erroneously not labeled with a feature label. The latter is the configurations, for example, when an expert who did the labeling of the test images did not recognize a feature or forgot to label it. To create the second set of training images, the hard-negative mining method described above is used in this example. Alternatively, the complete corresponding images could also be used.

The images of the second set of training images are then stored together with a corresponding information regarding the image sections, whether it is an erroneous recognition ("hard negative") or an erroneous labeling ("not labeled"). In addition, to the second set of training images can also be added the image sections that were correctly labeled as having a feature and this was correctly detected by the first neural networks.

In an eighth step 108 of the method 100, second neural networks are trained based on the second set of training images. Like the first neural networks, the second neural networks may be pre-trained or untrained neural networks. Further, the second neural networks are also, in particular, convolutional neural networks (CNNs). In the example shown herein, the second neural networks are prepared and trained analogously to the first neural networks, except that the training of the second neural networks is based on the second set of training images created in step 107. In other words, steps 104 to 106 are performed for the second neural networks.

Since the second neural networks are trained based on the training images created in step 107, the second neural networks are trained in particular to recognize features of a surface of components that were not correctly detected by the first neural networks. Thus, the second neural networks can be used to verify and, if necessary, correct a result of an analysis performed with the first neural networks. At least one second neural network of the second neural networks, in particular which provides the most reliable results, is then selected.

Optionally, further second sets of training images may be created, and further second neural networks may be trained based on these further second sets of training images. This may be done analogously to the second neural networks described above. The further second sets of training images may, for example, further contain training images that were not correctly detected by previously trained second neural networks. Accordingly, the aforementioned hard-negative mining method can be applied here with respect to the previously trained second neural networks. Furthermore, a hard-positive mining procedure can also be applied here.

In a ninth step 109, an ensemble of first neural networks and second neural networks is assembled. For this purpose, the first neural networks that provided the best feature recognition results selected in step 106 and the second neural networks that in turn provided the best feature recognition results are selected. The ensemble may comprise one first and one second neural network, respectively, or a plurality of first and/or a plurality of second neural networks, or one first and a plurality of second neural networks, or a plurality of first and one second neural network, respectively. Selecting multiple first and/or second neural networks for the ensemble may provide more robust feature detection results. Reducing the number of first or second neural networks for the ensemble may reduce a processing time and/or a computational cost of feature recognition. Optionally, the ensemble may correspondingly additionally comprise neural networks of the further second neural networks.

In step 109 of the method 100, coefficients are further assigned to the first and second neural networks, with which the results of an analysis of a surface of a component are respectively weighted. Whether or not a feature is recognized as such in a feature analysis is ultimately evaluated by weighting the results of the individual first and second neural networks. If further second neural networks are available, these can be weighted accordingly.

For this evaluation, the individual results of the feature recognition of the first or second neural networks are weighted according to the coefficients. The results of the individual first neural networks can also be weighted differently among each other. Likewise, the results of the individual second neural networks can also be weighted differently among each other.

For example, the results of the first neural networks are weighted with a coefficient factor of 0.6 and the results of the second neural networks are weighted with a coefficient factor of 0.4. If an averaged evaluation of a feature analysis with the first neural networks shows, for example, that a feature was detected with a probability of 60% at a certain position, this result is weighted with a factor of 0.6. If an evaluation of a feature analysis with the second neural networks shows that there is no feature at this location with a probability of 95%, this result of 95% is weighted with a factor of 0.4. In this example the evaluation of the second neural networks exceeds a result of the evaluation of the first neural networks so that the ensemble of the first and second neural networks predicts the result that with a higher probability no feature is present at the position. If further second neural networks are trained, these can be weighted analogously.

The advantage of the higher weighting of the first neural networks described here is that the first neural networks were trained on a more extensive database. Thus, the first neural networks deliver relatively reliable results in many areas. However, in areas where the first neural networks cannot provide reliable results, i.e., where a probability of correctness of the result is relatively low, these areas can be corrected on the basis of results provided by the second neural networks, if a probability of correctness of the result of the second neural networks exceeds the probability of correctness of the result of the first neural networks such that despite the weaker weighting the result of the second neural networks prevails.

The weighting described above can be determined in an automated manner in the example shown here by testing different weightings using test data and determining the ratio of the weightings of the first and second neural networks that provides the best final results when tested with the test data.

Figure 2:
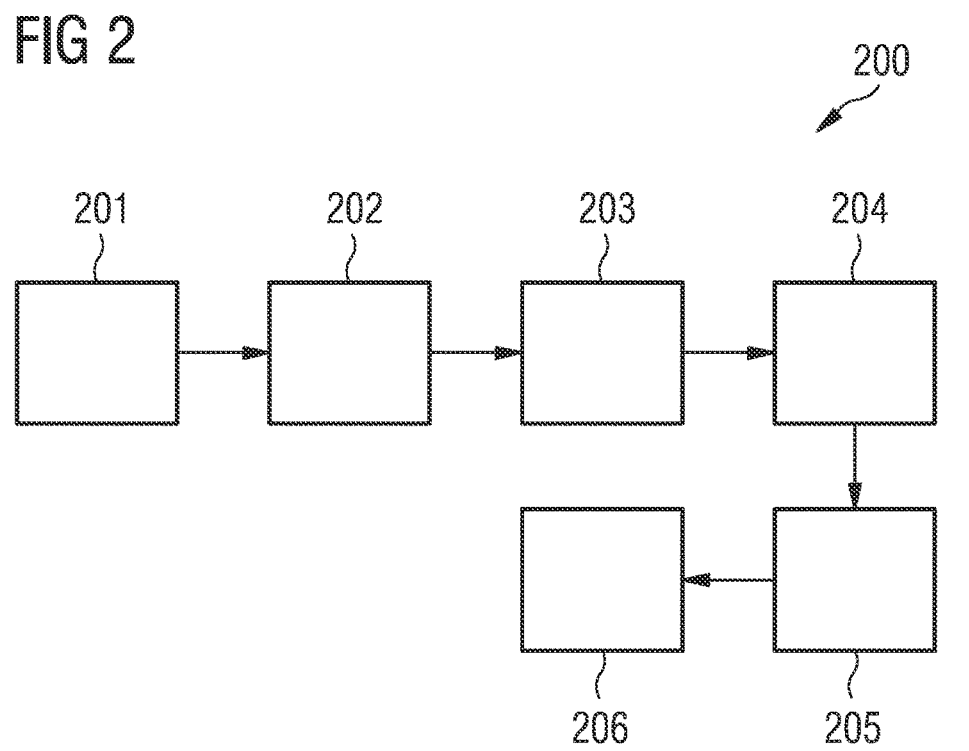
FIG. 2 shows a flow diagram of a method of analyzing a component.

FIG. 2 shows a flow chart of a method 200 of analyzing a component. The method 200 according to FIG. 2 is explained using an example in which a surface of a component is analyzed. However, this is only to be understood as an example. Analogously, the method 200 can also be used to analyze another part of a component. For example, cutting surfaces, fracture areas, X-ray images, ultrasound images or similar areas of the component can also be analyzed.

In a first step 201, an image of a surface of a component to be examined is captured. The image is, for example, a photograph taken with, for example, a camera, a cell phone, a tablet PC, or other capturing device. The image is, for example, a 2D RGB image. Alternatively, another image type may be used instead of the 2D-RGB image, for example, black and white images, gray scale images, other photographic images, X-ray images, ultrasound images and the like. An image type of the captured image matches an image type of such images used for training for a best result of the analysis.

Alternatively, if the image was captured at an earlier time, the image may merely be received in step 201, for example, from a database.

In a second step 202, the image acquired in step 201 is divided into image sections. The image sections may be divided such that they are adjacent to each other or at least partially overlap. In particular, the size of the image sections is adapted to an input size for neural networks used to analyze the surface. An overlapping of the image sections may be advantageous, for example, for a visualization of the analysis results.

In a third step 203, an ensemble of at least one first neural network and at least one second neural network is used to perform feature recognition for each image section of the captured image. The image sections may be augmented before or during performing the feature recognition. The augmenting substantially corresponds to the augmenting described with reference to FIG. 1 and is not described again here. For example, the ensemble of at least one first and at least one second neural network is the ensemble of first and second neural networks generated according to FIG. 1.

The results of the feature recognition of the first neural networks and the second neural networks are averaged among each other and then the averaged results of the first neural networks and the averaged results of the second neural networks are weighted against each other to generate a final result of the feature recognition. This weighting corresponds to the weighting described with reference to FIG. 1 and is not described here again. In addition to the information whether a feature is present or not, the ensemble of first and second neural networks is further used to determine what type of feature it is. In other words, the features are also classified if different feature classes have been trained to the neural networks.

In a fourth step 204, regions that were evaluated as relevant during the feature detection in step 203 are localized on the image sections. For the localization of these regions, the so-called class activation mapping method is used. The weighted results of the output layers of the first and second neural networks, respectively, are projected back onto convolutional feature maps of the respective first and second neural networks. In other words, locations are visualized as salient where the ensemble of first and second neural networks has detected a feature. In this visualization of the result of the feature recognition of the first and second neural networks, the pixels of the image sections are color weighted. The color of the pixels here corresponds to a probability with which the ensemble of first and second neural networks has recognized a feature. To better visualize the features on image sections, class activation maps are formed separately for augmented image sections and then averaged over them. This is also referred to as gradient fill.

In a fifth step 205, a heat map is created and overlaid on the image captured in step 201. The heat map is created by averaging the augmented class activation maps from step 204. Each pixel in the heat map represents a probability that a feature exists at the location. The heat map is displayed semi-transparently over the captured image so that the color gradations of the probabilities of the feature analysis results can be used to immediately indicate in the original image at which locations features were detected.

In a sixth step 206, after an expert has verified the correctness and completeness of the detected features, the original image is labeled based on the heat map. In other words, it is determined with respect to the original image, based on coordinates, at which locations what kind of features are located. This labeled original image corresponds to the labeled training data described with reference to FIG. 1 used in step 101. The original image that was labeled is then stored and added to a set of training images. In this way, richer training data is generated, which can be used to further train first and second neural networks, for example, using the methods 100 as described with reference to FIG. 1.

The methods 100 and 200 described according to FIGS. 1 and 2 are computer-implemented methods.

Figure 3:
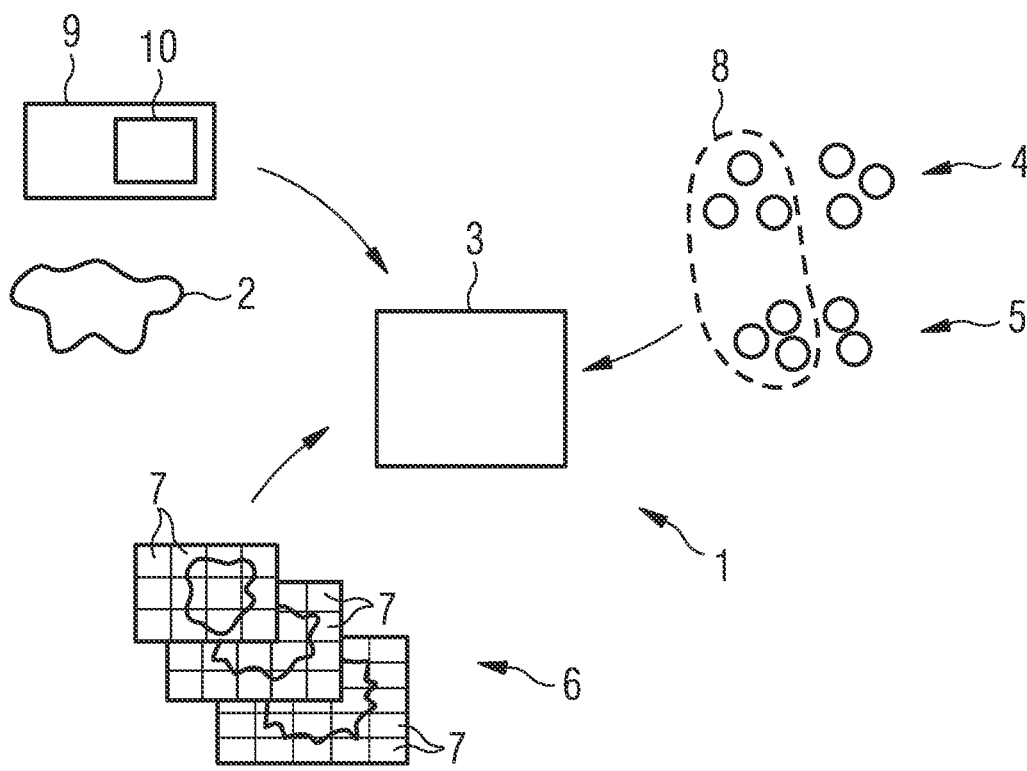
FIG. 3 shows a schematic depiction of a device that trains a system and analyzes a component.

FIG. 3 shows a schematic depiction of a device 1 that trains a system to analyze a component 2. The device 1 is further configured to analyze a component 2. The device 1 according to FIG. 3 is explained using the example of a surface of a component to be analyzed. However, this is only to be understood as an example. Analogously, the device 1 can also be used to analyze another part of a component. For example, cutting surfaces, fracture areas, X-ray images, ultrasound images or similar areas of the component can also be analyzed.

In particular, the apparatus 1 is adapted to perform the method 100 and the method 200 described with reference to FIGS. 1 and 2. The apparatus 1 comprises a computer system 3 arranged to train first neural networks 4 and second neural networks 5.

To train the first neural networks 4 and the second neural networks 5, the computer system 3 accesses training images 6. The training images 6 comprise a first set of training images, based on which the first neural networks 4 are trained, and at least one test data set, based on which the trained first neural networks 4 are tested and from which a second set of training images is generated. The second set of training images is used to train the second neural networks 5. Further second neural networks 5 can then be trained using further second sets of training images, which have been created, for example, by using further test data sets to test the previously trained second neural networks 5.

The training images 6 are 2D RGB images showing surfaces of components. However, the training images 6 can also be images of a different type as described above. The training images 6 are each divided into image sections 7. Information on specific image sections 7, in which features on the surface of the imaged components are recognizable, is stored in addition to the training images 6.

The computer system 3 is arranged to train and test the first neural networks 4 as well as the second neural networks 5, select an ensemble 8 of first and second neural networks 4, 5 and weight the first and second neural networks 4, 5 of the ensemble 8. Details thereof will not be repeated here, reference is made to the discussion with respect to FIGS. 1 and 2.

The device 1 further comprises a recording and display device 9, which in the example shown here is a mobile device such as a smartphone or a tablet PC. The recording and display device 9 can be used to capture a 2D-RGB image of the component 2 whose surface is to be analyzed. For other types of images, other recording and displaying devices are used accordingly such as X-ray devices, ultrasound devices and the like. Devices that capture and display captured images can of course also be implemented in separate devices.

The capture and display device 9 is arranged to send the captured image to the computer system 3. The computer system 3 is arranged to perform a feature recognition on the captured image using the ensemble 8 of first neural networks 4 and second neural networks 5.

The computer system 3 is arranged to send a result of the feature recognition to the recording and display device 9. The recording and display device 9 has a display 10 on which the result of the feature recognition received from the computer system 3 can be shown with reference to the captured image of the component 2.

The recording and display device 9 may also be used to capture the training images 6. Alternatively, the training images 6 may also have been captured by another device.

In the example shown here, the computer system 3 and the recording and display device 9 are separate devices. Alternatively, these can also be integrated in one device. Furthermore, at least parts of the device 1 can also be implemented as a cloud solution.

The invention claimed is:

1. A method of analyzing a component comprising:
  receiving an image of the component;
  performing feature recognition on the received image using a plurality of neural networks, wherein at least one first neural network of the plurality of neural networks is trained based on a first set of training images, wherein the first set of training images comprises training images showing at least a portion of at least one component and recognizable features on the at least one component are marked in the training images of the first set, at least one second neural network of the plurality of neural networks is trained based on the at least one second set of training images, wherein the at least one second set of training images comprises training images in which features on at least one component have not been correctly detected by the at least one first neural network and recognizable features on the training images of the second set of training images are marked or image sections of the training images comprising a recognizable feature are assigned to corresponding feature classes, and the at least one first neural network and the at least one second neural network each comprise a global pooling layer; and
  displaying a result of the feature recognition with reference to a depiction of the component.

2. The method according to claim 1, wherein the depiction of the component with respect to which the result of the feature recognition is displayed is the received image of the component.

3. The method according to claim 1, wherein, to display the result of the feature recognition, a method of representing probabilities calculated using neural networks is used.

4. The method according to claim 1, wherein at least a portion of the received image is augmented before or during performing feature recognition.

5. The method according to claim 1, wherein the received image of the component is further used to further train at least one of the plurality of neural networks.

6. The method according to claim 1, wherein, if a size of the received image does not correspond to an input size of the at least one first and/or the at least one second neural network, the received image is divided into a plurality of image sections prior to performing the feature recognition.

7. The method according to claim 1, wherein, in performing the feature detection, a first feature detection is performed with the at least one first neural network and a second feature detection is performed with the at least one second neural network, and results of the first feature detection and the second feature detection are proportionally weighted to calculate the result of the feature detection.

8. A method of training a system to analyze a component comprising:

creating a first set of training images, wherein the first set of training images comprises training images showing at least a portion of at least one component and recognizable features on the at least one component are marked in the training images of the first set;

training at least one first neural network based on the first set of training images, wherein the at least one first neural network comprises a global pooling layer;

creating at least one second set of training images, the at least one second set of training images comprising training images in which features on at least one component have not been correctly detected by the at least one first neural network;

training at least one second neural network based on the at least one second set of training images, wherein the at least one second neural network comprises a global pooling layer and recognizable features on the training images of the second set of training images are marked or image sections of the training images comprising a recognizable feature are assigned to corresponding feature classes; and aggregating the at least one first neural network and the at least one second neural network into a plurality of neural networks.

9. The method according to claim 8, wherein the training of the at least one first neural network and/or the training of the at least one second neural network is performed using supervised learning.

10. The method according to claim 8, wherein the features not correctly detected by the at least one first neural network comprise such features detected by the at least one first neural network, although a corresponding location of an associated training image is not marked and a component depicted in the associated training image has no feature at this location, and/or the features not correctly detected by the at least one first neural network comprise features not detected by the at least one first neural network, although a corresponding location of an associated training image is marked and a component depicted in the associated training image has a feature at this location, and/or the features not correctly detected by the at least one first neural network comprise such features detected by the at least one first neural network, although a corresponding position of an associated training image is not marked but a component mapped in the associated training image has a feature at this location.

11. The method of claim 8, wherein aggregating the at least one first neural network and the at least one second neural network into a plurality of neural networks further comprises:

assigning a first weighting with which a result of an analysis with the at least one first neural network is evaluated; and assigning at least one second weighting with which a result of an analysis with the at least one second neural network is evaluated.

12. A device that analyzes a surface of a component is configured to perform the method according to claim 1.

13. The method according to claim 1, wherein, a class activation mapping method is used to display the result of the feature recognition.

* * * * *